United States Patent

Suzuki

[15] 3,671,595
[45] June 20, 1972

[54] PROCESS FOR THE PRODUCTION OF 1,2,4,5,6,7,8,8-OCTACHLORO-3A,4,7,7A-TETRANYDRO-4,7-METHANOINDANE

[72] Inventor: Henry K. Suzuki, Chicago, Ill.
[73] Assignee: Velsicol Chemical Corporation, Chicago, Ill.
[22] Filed: Dec. 29, 1969
[21] Appl. No.: 888,872

[52] U.S. Cl. .................................................. 260/648 C
[51] Int. Cl. ................................... C07c 17/04, c07c 23/24
[58] Field of Search ................................... 260/648 C

[56] References Cited

UNITED STATES PATENTS 2,528,656  11/1950  Herzfeld et al. ................... 260/648 C
3,000,974   9/1961  Kleiman et al. .................... 260/648 C

OTHER PUBLICATIONS

Mellor, A Comprehensive Treatise on Inorganic & Theoretical Chem. Vol. X, p. 634 (1930)

*Primary Examiner*—Daniel D. Horwitz
*Attorney*—Robert J. Schwarz

[57] ABSTRACT

This invention discloses a process for the production of 1,2,4,5,6,7,8,8-octachloro-3a,4,7,7a-tetrahydro-4,7-methanoindane by chlorinating 4,5,6,7,8,8-hexachloro-3a,4,7,7a-tetrahydro-4,7-methanoindene in the presence of carbon disulfide.

8 Claims, No Drawings

PROCESS FOR THE PRODUCTION OF 1,2,4,5,6,7,8,8-OCTACHLORO-3A,4,7,7A-TETRANYDRO-4,7-METHANOINDANE

This invention relates to a process for preparing a novel isomeric mixture of the compound 1,2,4,5,6,7,8,8-octachloro-3a,4,7,7a-tetrahydro-4,7-methanoindane.

It is well known that the addition of chlorine to an equimolar amount of the Diels-Alder adduct of hexachlorocyclopentadiene and cyclopentadiene results in a mixture of closely related products exhibiting remarkable insecticidal activity. This mixture consists predominantly of compounds having the empirical formula $C_{10}H_5Cl_7$ known as heptachlor, $C_{10}H_6Cl_8$ known as chlordane and $C_{10}H_5Cl_9$ known as nonachlor. Chlordane is the major component in this mixture and is usually present in an amount ranging up to 60 percent by weight of the total mixture. While this mixture is generally used as such for application as an insecticide and has met with great commercial success it has been found that the compounds having the empirical formula $C_{10}H_6Cl_8$ have a particularly desirable balance of properties in that the ratio of insecticidal toxicity to mammalian toxicity is relatively high.

The compounds of the formula $C_{10}H_6Cl_8$ consist substantially of two stereoisomers of 1,2,4,5,6,7,8,8-octachloro-3a,4,7,7a-tetrahydro-4,7-methanoindane hereinafter referred to as α-chlordane and γ-chlordane. These compounds, in a pure state, are white crystalline solids having melting points of 106° to 108° C and 103° to 105° C respectively.

The process of the present invention concerns itself with a method of preparing a mixture of α- and γ-chlordane in exceedingly high yields and to the substantial exclusion of both heptachlor and nonachlor. Moreover this process concerns itself with a method of preparing an isomeric mixture of chlordane wherein the α-isomer is the major component.

In its broadest scope the process of this invention comprises reacting the Diels-Alder adduct of hexachlorocyclopentadiene and cyclopentadiene, known as 4,5,6,7,8,8,-hexachloro - 3a,4,7,7a-tetrahydro-4,7-methanoindene and hereinafter referred to as chlordene with at least an equimolar amount of chlorine in the presence of carbon disulfide. Unexpectedly this process results in a product containing at least about 90 percent and often as much as 99 percent by weight chlordane, less than 3 percent by weight heptachlor and only trace amounts of nonachlor. Furthermore, the product of the present invention contains an α- to γ-chlordane ratio of at least about 2 to 1.

The presence of carbon disulfide is essential in the process of this invention and an amount of about 10 percent by weight or more is required. While the mechanism by which the carbon disulfide operates in the process is not completely understood, its utilization is responsible for the suppression of both heptachlor and nonachlor in the reaction product.

The process of this invention can be carried out in a liquid organic reaction medium which is inert to the chlorination conditions employed. Solvents such as carbon tetrachloride, chloroform, benzene, chlorobenzene and the like are suitable. Solutions of chlordene in these solvents containing from about 5 to about 60 percent by weight of the chlordene starting material can be used. Carbon disulfide itself can be suitably used as the reaction medium of the present process, obviating the need for other solvents.

As indicated above, chlordene is reacted with at least an equimolar amount of chlorine to produce the desired product chlordane. In practice a slight molar excess of chlorine such as from about 1.05 to about 1.20 moles of chlorine per mole of chlordene can be effectively utilized to insure complete conversion of the starting material. Larger amounts of chlorine than those indicated while not directly harmful result in no advantage and are not used for economic reasons.

The process of this invention is preferably carried out at relatively mild reaction conditions in order to favor the addition reaction across the double bond of chlordene rather than the substitution reaction at the allylic hydrogen. The particular reaction temperature employed in the process is not critical but temperatures ranging between about 20° C and about 100° C are preferred and temperatures of from about 30° to about 80° C are most preferred. When the boiling point of the solvent used as a reaction medium is within this range the process can be conveniently carried out at the reflux temperature of the reaction mixture. Temperatures below the indicated range are not harmful for the present process but result in slow reactions requiring excessively long reaction times. Higher temperatures than indicated however will result in increased proportions of heptachlor present in the final product and are therefore undesirable.

It has also been found that a catalyst can be advantageously utilized in the process of this invention. In particular it has been found that free radical initiating catalysts such as peroxide catalyst can result in higher yields of chlordane than otherwise possible. Thus, while the use of such a catalyst is not essential, it is a preferred mode of carrying out the present process. Exemplary catalyst which can be used in this process are benzoyl peroxide, methyl ethyl ketone peroxide, p-chlorobenzoyl peroxide, 2,4-dichlorobenzoyl peroxide, t-butyl-perbenzoate, t-butyl peroxypivalate and azobisisobutyronitrile. The amount of catalyst that can be used to effectively catalyze the process can range from about 0.05 percent to about 2.0 percent by weight based on the starting material chlordene.

The process of this invention can be readily effected with conventional reaction equipment. Typically a solution of chlordene in the inert solvent is charged into a suitable reaction vessel equipped with a reflux condenser, gas addition inlet, stirring means and temperature controlling means. The carbon disulfide and the free radical initiating catalyst, if used, is added to the reactor and the reaction mixture is heated to the desired temperature. Chlorine gas is then added into the mixture with vigorous stirring while maintaining the reaction temperature within the required limits. After the chlorine addition is completed the reaction mixture can be stirred for a period of from about 15 minutes to several hours to insure the completion of the reaction and thereafter can be treated with activated charcoal to remove the catalyst if used. The reaction mixture can then be stripped of solvents to yield the desired product.

When carbon disulfide alone or in major proportions is used as the reaction medium precautions to prevent carbon disulfide vapor and air mixtures from forming must be taken since such mixtures can be explosive. Usually an inert atmosphere such as nitrogen or carbon dioxide can be provided to the reaction vessel to mitigate such danger.

The process of the present invention is more specifically illustrated in the following examples:

EXAMPLE 1

A carbon tetrachloride solution (63 ml) containing chlordene (33.9 grams; 0.10 mol), benzoyl peroxide (0.17 grams) and carbon disulfide (5 ml) were charged into a glass reaction vessel equipped with a stirrer, thermometer, reflux condenser and gas addition tube. The reaction mixture was heated to about 65° C and chlorine gas (0.105 mol) was bubbled into the mixture at a rate of about 0.12 grams per minute. The temperature of the reaction mixture during the chlorine addition rose from 65° to 70° C. After the addition was completed the mixture was stirred for another 15 minutes. After this time a sample of the reaction mixture was subjected to gas chromatographic analysis and was found to consist of 65 percent α-chlordane, 29 percent γ-chlordane, 2.2 percent heptachlor and 3.6 percent chlordene. The reaction mixture was then treated with activated carbon to destroy the remaining benzoyl peroxide catalyst. The reaction mixture was then filtered and stripped of solvents to yield the desired product.

EXAMPLE 2

A carbon tetrachloride solution (59 ml) containing chlordene (31.4 grams; 0.0928 mol) benzoyl peroxide (0.16 grams), carbon disulfide (10 ml) and additional carbon tetrachloride (45 ml) were charged into a glass reaction vessel equipped with a stirrer, thermometer, reflux condenser and gas addition tube. The reaction mixture was heated to a temperature of about 60° C and chlorine gas (7.24 grams; 0.102 mol) was bubbled into the mixture at a rate of 0.12 grams per minute over a period of about 60 minutes. The temperature of the reaction mixture rose to about 65° C during the chlorination. After the chlorine addition was completed a sample of the reaction products was subjected to gas chromatographic analysis and was found to consist of 69 percent α-chlordane, 27 percent γ-chlordane, 1.6 percent heptachlor and 2.1 percent of chlordene. The reaction mixture was then treated with activated carbon to remove any remaining benzoyl peroxide, was filtered and was stripped of solvents under reduced pressure to yield a viscous liquid. This liquid was seeded with a crystal each of α- and γ-chlordane resulting in the solidification of the desired product.

EXAMPLE 3

Carbon disulfide (102 ml), chlordene (37.46 grams; 0.1105 mol) and benzoyl peroxide (0.19 grams) were charged into a glass reaction flask equipped with a stirrer, thermometer, reflux condenser and gas addition tube. The flask was purged with dry nitrogen gas and was heated to a temperature of about 42° C. Chlorine gas (0.1160 mol) was then bubbled into the reaction mixture over a period of about 15 minutes while the mixture was cooled to maintain the temperature between about 40° and about 44° C. After this time the reaction mixture was refluxed for a period of about 25 minutes and nitrogen gas was bubbled through the mixture for about 10 minutes. A sample of the reaction mixture was subjected to gas chromatographic analysis and was found to contain 66 percent α-chlordane, 23 percent γ-chlordane, 3 percent heptachlor and 9 percent unreacted starting material. Additional chlorine (0.116 mol) was added to the reaction mixture in the same manner described above. After this addition was completed the mixture was again purged with nitrogen gas and thereafter upon gas chromatographic analysis was found to consist of 72 percent α-chlordane, 26 percent γ-chlordane and 2.5 percent heptachlor.

EXAMPLE 4

Carbon disulfide (102 ml), chlordene (37.46 grams; 0.1105 mol) and benzoyl peroxide (0.19 grams) were charged into a glass reaction flask equipped with a stirrer, thermometer, reflux condenser and gas addition tube. The reaction flask was purged with dry nitrogen gas and was heated to a temperature of about 40° C. Chlorine gas (0.1160 mol) was bubbled into the reaction mixture over a period of about 15 minutes. After this time the reaction mixture was refluxed for a period of about 25 minutes and was then purged again with nitrogen gas. A sample of the reaction products was subjected to gas chromatographic analysis and was found to contain 69 percent α-chlordane, 24 percent γ-chlordane 1 percent heptachlor and 5 percent unreacted starting material. The reaction mixture was then further chlorinated with an additional amount of chlorine (0.023 mol) and thereafter was found upon gas chromatographic analysis to contain 73 percent α-chlordane, 26 percent γ-chlordane and 1 percent heptachlor as products.

EXAMPLE 5

A solution of chlordene (33.9 grams; 0.1 mol) in benzene (100 ml) and carbon disulfide (20 ml) are charged into a glass reaction vessel equipped with a stirrer, thermometer, reflux condenser and gas addition tube. The reaction mixture is heated to its reflux temperature and chlorine gas (7.8 grams; 0.11 mol) is slowly bubbled into the mixture over a period of about 1 hour. After the addition is completed the mixture is stirred for a period of about 30 minutes to insure the completion of the reaction. After this time the reaction mixture is stripped of benzene and carbon disulfide under reduced pressure to yield the desired product of α- and γ-chlordane.

EXAMPLE 6

A solution of chlordene (33.9 grams; 0.1 mol) in carbon tetrachloride (75 ml), carbon disulfide (4.0 grams) and methyl ethyl ketone peroxide (0.34 grams) are charged into a glass reaction vessel equipped with a stirrer, thermometer, reflux condenser and gas addition tube. The reaction mixture is heated to about 45° C and chlorine gas (8.5 grams; 0.12 mol) is slowly bubbled into the mixture over a period of about 45 minutes while maintaining the temperature between about 45 and 50° C. After the addition is completed the mixture is stirred for a period of about 1 hour to insure the completion of the reaction. After this time the reaction mixture is treated with activated charcoal and is filtered. The filtered solution is then stripped of solvents under reduced pressure to yield the desired product of α- and γ-chlordane.

EXAMPLE 7

A solution of chlordene (33.9 grams; 0.1 mol) in chlorobenzene (100 ml), carbon disulfide (10 grams) and p-chlorobenzoyl peroxide (0.017 grams) are charged into a glass reaction vessel equipped with a stirrer, thermometer, reflux condenser and gas addition tube. The reaction mixture is heated to a temperature of between about 90° and 100° C and chlorine gas (14 grams) is then slowly added to the mixture over a period of about 1 hour. After the addition is completed the mixture is stirred for a period of about 15 minutes to insure completion of the reaction. After this time the reaction mixture is cooled to room temperature treated with activated charcoal and is filtered. The filtered solution is then stripped of solvents under reduced pressure to yield the desired product of α- and γ-chlordane.

EXAMPLE 8

A solution of chlordene (33.9 grams; 0.1 mol) in chloroform (100 ml), carbon disulfide (25 grams) and 2,4-dichlorobenzoyl peroxide (0.68 grams) are charged into a glass reaction vessel equipped with a stirrer, thermometer, reflux condenser and gas addition tube. The reaction mixture is heated at reflux and chlorine gas (7.1 grams; 0.1 mole) is slowly added to the mixture over a period of about 45 minutes. After the addition is completed stirring is continued for a period of about 30 minutes to insure completion of the reaction. After this time the reaction mixture is cooled to room temperature, is treated with activated charcoal and is filtered. The filtered solution is then stripped of solvents under reduced pressure to yield the desired product of α- and γ-chlordane.

EXAMPLE 9

A solution of chlordene (33.9 grams; 0.1 mol) in carbon tetrachloride (100 ml) carbon disulfide (15 grams) and t-butyl perbenzoate (0.34 grams) are charged into a glass reaction vessel equipped with a stirrer, thermometer, reflux condenser, and gas addition tube. Chlorine gas (14 grams) is slowly added to the mixture over a period of about 1 hour while maintaining the temperature of the mixture between about 20° and 30° C. After the addition is completed stirring is continued for a period of about 2 hours to insure completion of the reaction. After this time the reaction mixture is treated with activated charcoal and is stripped of solvent to yield the desired product of α- and γ-chlordane.

EXAMPLE 10

A carbon tetrachloride solution (69 ml) containing chlordene (37.46 grams; 0.1105 mol) and benzoyl peroxide (0.19 grams) was charged into a glass reaction flask equipped with a stirrer, reflux condenser, thermometer and gas addition tube. The reaction mixture was heated with stirring to a temperature of about 65° C and chlorine (0.1160 mol) was slowly added over a period of about 25 minutes. The temperature of the reaction mixture during the chlorine addition was maintained between about 58° and 62° C. After all of the chlorine had been added the reaction mixture was stirred for an additional period of about 15 minutes at a temperature of about 60° C. A sample of the reaction products was then subjected to gas chromatography and was found to contain a combined α-chlordane and nonachlor content of 32 percent, a γ-chlordane content of 24 percent, a heptachlor content of 8 percent and 35 percent of unreacted starting material. The exact amount of nonachlor could not be determined due to some overlapping of the curves representing the α-chlordane and nonachlor. An approximation of the respective area however was possible and nonachlor represented about one-sixth of the combined areas. Thus the product of this example contained about 5 percent nonachlor.

I claim:

1. A process for the production of 1,2,4,5,6,7,8,8-octachloro-3a,4,7,7a-tetrahydro-4,7-methanoindane which comprises reacting in a liquid reaction medium 4,5,6,7,8,8-hexachloro-3a,4,7,7a-tetrahydro-4,7-methanoindene with at least an equimolar amount of chlorine in the presence of at least about 10 percent by weight carbon disulfide at a temperature between about 20° C and about 100° C.

2. The process of claim 1 wherein the reaction is carried out in an inert organic reaction medium selected from the group consisting of carbon tetrachloride, benzene, chlorobenzene and chloroform.

3. The process of claim 1 which comprises reacting a solution containing from about 5 to about 60 percent by weight of 4,5,6,7,8,8-hexachloro-3a,4,7,7a-tetrahydro-4,7-methanoindene in carbon disulfide with at least an equimolar amount of chlorine.

4. The process of claim 1 wherein the reaction is carried out in the presence of a free radical initiating catalyst.

5. The process of claim 4 wherein the free radical catalyst is selected from the group consisting of benzoyl peroxide, p-chlorobenzoyl peroxide, 2,4-dichlorobenzoyl peroxide, t-butyl perbenzoate, t-butyl peroxypivalate and azobisisobutyronitrile.

6. The process of claim 1 which comprises reacting 4,5,6,7,8,8-hexachloro-3a,4,7,7a-tetrahydro-4,7-methanoindene with at least an equimolar amount of chlorine in the presence of at least about 10 percent by weight of carbon disulfide and in the presence of a free radical initiating catalyst.

7. The process of claim 3 wherein the reaction is carried out in the presence of a free radical initiating catalyst.

8. The process of claim 6 wherein the free radical initiating catalyst is benzoyl peroxide.

* * * * *